April 21, 1970        F. M. POTTER        3,508,241
BEARING FAILURE SENSING DEVICE
Filed Sept. 6, 1967
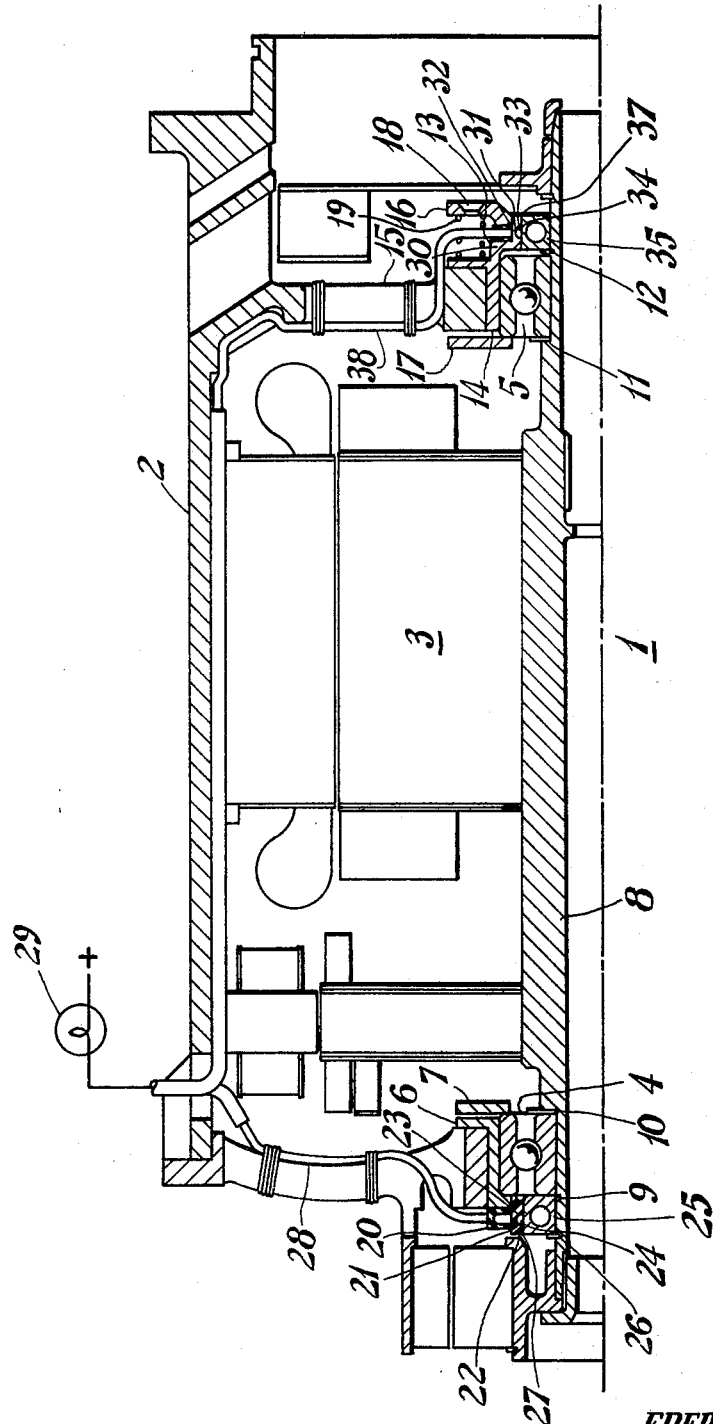
INVENTOR.
*FREDERICK M. POTTER*
BY
*ATTORNEY*

United States Patent Office 3,508,241
Patented Apr. 21, 1970

3,508,241
BEARING FAILURE SENSING DEVICE
Frederick Milton Potter, Little Silver, N.J., assignor to
The Bendix Corporation, a corporation of Delaware
Filed Sept. 6, 1967, Ser. No. 665,859
Int. Cl. F16c 19/52; G08b 21/00
U.S. Cl. 340—269                                    8 Claims

ABSTRACT OF THE DISCLOSURE

A bearing failure sensing device having an auxiliary bearing mounted on the shaft and normally having a clearance from the bearing housing and means to provide a signal upon the auxiliary bearing contacting the bearing housing.

CROSS REFERENCE TO RELATED APPLICATION

U.S. application Ser. No. 649,341, filed June 27, 1967 relates to the same field of the invention.

BACKGROUND OF THE INVENTION

Field of the invention

The invention relates to the field of detecting bearing failure in rotating equipment.

Description of the prior art

In the past various devices have been utilized to provide a signal upon a bearing failure, however, the signal does not occur until the bearing has completely failed. Some depend upon the rotating part rubbing the insulation from a wire embedded in the static part of the device. The disadvantage of the aforenoted is that the signal does not occur prior to damage of the parts, for example, the rotor of a dynamoelectric machine has come into contact with the stator causing damage to one or both. In the present invention, the auxiliary bearings will support the rotor for a time sufficient to bring it to a stop.

SUMMARY

The present invention provides means for sensing bearing failure prior to damage to the parts. Heretofore the failure sensing did not provide sufficient time to bring the rotating member to a stop before it caused damage. In the present invention, should a bearing fail in any manner, the rotor shaft will be supported by the auxiliary bearing thus preventing damage.

BRIEF DESCRIPTION OF THE DRAWING

The single figure is a partial cutaway view of a dynamoelectric machine embodying the invention.

DESCRIPTION OF THE PREFERRED EMBODIMENT

Referring now to the drawing, for purposes of illustration, a dynamoelectric machine is indicated generally by the numeral 1. It is understood that the invention is not limited to dynamoelectric machines, but may include other types of rotating equipment utilizing bearings. Only that portion of the machine 1 involving the invention is illustrated in detail. The dynamoelectric machine has a housing 2 in which an armature 3 is rotatably supported therein by bearings 4 and 5.

The bearing 4 is mounted in the housing 2 by a bearing liner 6, clamping member 7 and retaining screws (not shown). The bearing 4 is positioned on a shaft 8 of the rotor 3 by a snap ring 9 and shoulder 10 on the shaft 8. The bearing 5 is positioned on the shaft 8 of the rotor 3 by shoulder 11 on the shaft 8 and a snapring 12. The bearing 5 is mounted in the housing 2 by bearing liner 13 which fits into a bore 14 supported by arms 15 in the housing 2. The outer race of the bearing 5 is clamped by clamping member 16 and ring 17 by a plurality of bolts 18. Spring means 19 are provided between the clamping member 16 and bearing liner 13 to preload the bearing 5.

The bearing liner 6 has an outward extending flanged section 20 having a groove 21 extending around the inner perimeter thereof. A wire 22, for example of copper, is mounted in and insulated from the groove 21 of the section 20 by a suitable insulation 23 such as an epoxy. The wire 22 has a bare surface 24 which may be formed when the bore of the liner 6 is machined. A bearing 25 is secured on the shaft 8 of the rotor 3 adjacent to the bearing 4 by lockring 26 in register with the flanged section 20. The bearing 25 is of a diameter to normally provide a small clearance 27 from the flanged section 20 of the bearing liner 6, for example, .001" to .002". The wire 22 is connected by conductor 28 which extends to a pin of the generator connector from which it may connect to one side of a suitable indicator 29 illustrated as a lamp. The other side of the indicator is connected to a suitable source of current (not shown).

In like manner, the bearing liner 13 has an outwardly extending flanged section 30 having a groove 31 extending around the inner perimeter thereof. A wire 32, copper for example, is mounted in and insulated from the groove 31 of the flanged section 30 by a suitable insulation 33, for example an epoxy. The wire 32 has a bare surface 34 which may be formed when the bore of the liner 13 is machined. A bearing 35 is secured on the shaft 8 of the rotor 3 adjacent to the bearing 5 and in register with the flanged section 30. The bearing 35 is of a diameter to normally provide a small clearance 37 from the flanged section 30 of the bearing liner 13, for example .001" to .002". The wire 32 is connected by a conductor 38 which extends to the pin on the generator connector from which it connects with the lead 28 to the indicator 29.

In operation, the bearings 25 and 35 rotate with the shaft 8 and normally have a clearance from the respective flanges of the bearing liners 0 and 13. Upon the failure of either or both of the bearings 4 and 5 in any manner whatsoever, including but not limited to wearing of the bore of the liner and the O.D. of the bearings, the shaft 8 will be displaced radially, due to gravity or magnetically out of balance. This will cause either one or both of the bearings 25 and 35 to contact the flanged section of the respective bearing liner to support the load of the rotor 3. At the same time an indication that the auxiliary bearings 25 and 35 are picking up the load is obtained by the outer races of the auxiliary bearings contacting the bare surface of the wires 22 and 32 to close an electrical circuit to ground which actuates the indicator lamp to indicate a bearing failure. The machine may then be disconnected from its driving source and will come to rest without sustaining any damage as the rotor is supported by auxiliary bearings.

Although only one embodiment of the invention has been illustrated and described, various changes in the form and relative arrangement of the parts, which will now appear to those skilled in the art may be made without departing from the scope of the invention.

1. A bearing failure sensing means comprising, a housing, a rotatable shaft, main bearing means mounting said shaft for rotation in said housing, auxiliary bearing means mounted on said shaft adjacent to said main bearing means and rotatable with said shaft, said auxiliary bearing means normally having a predetermined clearance from said housing, and means providing an indication upon failure of said main bearing means when said auxiliary bearing means contact said housing.

2. The combination as set forth in claim 1 in which said main bearing means are supported in said housing by a bearing liner.

3. The combination as set forth in claim 2 in which said bearing liner has a flanged section in register with said auxiliary bearing.

4. The combination as set forth in claim 3 in which said flanged section has a groove around the inner periphery thereof with a conductor secured in said groove and insulated therefrom.

5. The combination as set forth in claim 4 in which said conductor is connected to an indicator.

6. The combination as set forth in claim 1 in which said housing is a generator housing and said shaft mounts a generator rotor.

7. The combination as set forth in claim 1 in which a failure of said main bearing means causes said auxiliary bearing means to contact said housing thereby to close an electric circuit.

8. The combination as set forth in claim 1 in which said auxiliary bearing means are ball bearings.

References Cited

UNITED STATES PATENTS

| | | | |
|---|---|---|---|
| 449,411 | 3/1891 | Hannah | 340—269 |
| 3,183,043 | 5/1965 | Creeger et al. | |
| 3,411,706 | 11/1968 | Woollenweber et al. | 308—35 X |

FOREIGN PATENTS 148,914  3/1937  Austria.

JOHN W. CALDWELL, Primary Examiner

P. PALAN, Assistant Examiner

U.S. Cl. X.R.

308—35